United States Patent [19]

Beardsley et al.

[11] Patent Number: 5,497,483

[45] Date of Patent: Mar. 5, 1996

[54] METHOD AND SYSTEM FOR TRACK TRANSFER CONTROL DURING CONCURRENT COPY OPERATIONS IN A DATA PROCESSING STORAGE SUBSYSTEM

[75] Inventors: Brent C. Beardsley; William F. Micka, both of Tucson, Ariz.; Yoram Novick, Haifa, Israel

[73] Assignee: International Business Machines Corporation, Armonk, N.Y.

[21] Appl. No.: 949,664

[22] Filed: Sep. 23, 1992

[51] Int. Cl.⁶ ................................................ G06F 11/00
[52] U.S. Cl. ......................... 395/575; 395/427; 395/410
[58] Field of Search .................................. 395/575, 425, 395/400, 250; 364/260.2, 268.1, 268.2, 282.1

[56] References Cited

U.S. PATENT DOCUMENTS

| | | | |
|---|---|---|---|
| 4,920,528 | 4/1990 | Sakemoto et al. | 369/54 |
| 5,210,866 | 5/1993 | Milligan et al. | 395/575 |
| 5,212,772 | 5/1993 | Masters | 395/200 |
| 5,241,668 | 8/1993 | Eastridge et al. | 395/575 |
| 5,241,669 | 8/1993 | Cohn et al. | 395/575 |
| 5,241,670 | 8/1993 | Eastridge et al. | 395/575 |
| 5,263,154 | 11/1993 | Eastridge et al. | 395/575 |

*Primary Examiner*—Hoa T. Nguyen
*Attorney, Agent, or Firm*—H. St. Julian; Andrew J. Dillon

[57] ABSTRACT

A method and system are disclosed for transferring backup copies of designated multi-track datasets which are stored in a plurality of storage subsystems to a host system via data channel during concurrent execution of an application. Upon receiving a request for a backup copy, execution of an application is temporarily suspended. A dataset logical-to-physical storage system address concordance is formed and execution of the application is resumed thereafter. Any application initiated updates to affected tracks within the designated datasets which occur prior to generation of a backup copy are processed by buffering the updates, copying the affected tracks to storage subsystem memory, updating the address concordance and writing the updates to the affected tracks within the dataset. Requests from the host system to transfer a selected sequence of tracks within the designated multi-track dataset are then examined to determine if the sequence includes affected tracks which have previously been copied to storage subsystem memory. An artificial track is then automatically substituted into the requested sequence of selected tracks for each affected track which has previously been copied to storage subsystem memory during transfer of the selected sequence of tracks such that the host system is made aware of the previous copying of these affected tracks.

12 Claims, 7 Drawing Sheets

TRANSFER TRACK INDICATING BIT MAP

| STARTING CYLINDER | STARTING TRACK | SEQUENTIAL TRACK LISTING |
|---|---|---|
| 1B | 0000 | 1010001000100..00 |

ARTIFICIAL TRACK INDICATING BIT MAP

| STARTING CYLINDER | STARTING TRACK | SEQUENTIAL TRACK LISTING |
|---|---|---|
| 1B | 0000 | 0010001000000..00 |

MODIFIED TRANSFER TRACK INDICATING BIT MAP

| STARTING CYLINDER | STARTING TRACK | SEQUENTIAL TRACK LISTING |
|---|---|---|
| 1B | 0000 | 1000000000100..00 |

METHOD AND SYSTEM FOR TRACK TRANSFER CONTROL DURING CONCURRENT COPY OPERATIONS IN A DATA PROCESSING STORAGE SUBSYSTEM

CROSS-REFERENCE TO RELATED APPLICATIONS

The present application is related to U.S. patent application Ser. No. 07/781,044, entitled "Method and Means For Time Zero Backup Copying of Data," filed Oct. 18, 1991, and assigned to the assignee herein named, now abandoned, U.S. patent application Ser. No. 07/871,787, entitled "A Method and System for Automated Backup Copy Ordering in a Time Zero Backup Copy Session," filed Apr. 20, 1992, and assigned to the assignee herein named, now U.S. Pat. No. 5,241,670, and U.S. patent application Ser. No. 07/575,741, entitled "Nonsynchronous DASD Control, filed Aug. 31, 1990, and assigned to the assignee herein named now U.S. Pat. No. 5,157,770. The contents of these cross-referenced United States patent applications are hereby incorporated herein by reference thereto.

BACKGROUND OF THE INVENTION

1. Technical Field

The present invention relates in general to methods and systems for improved concurrent copy operations in a data processing system and in particular to methods and systems for track transfer control during concurrent copy operations in a data processing system. Still more particularly, the present invention relates to methods and systems for automatically substituting an artificial track for a track which has been previously copied during track retrieval in a concurrent copy operation in a data processing system.

2. Description of the Related Art

A modern data processing system must be prepared to recover, not only from corruptions of stored data which occur as a result of noise bursts, software bugs, media defects, and write path errors, but also from global events, such as data processing system power failure. The most common technique of ensuring the continued availability of data within a data processing system is to create one or more copies of selected datasets within a data processing system and store those copies in a nonvolatile environment. This so-called "backup" process occurs within state-of-the-art external storage systems in modern data processing systems.

Backup policies are implemented as a matter of scheduling. Backup policies have a space and time dimension which is exemplified by a range of datasets and by the frequency of backup occurrence. A FULL backup requires the backup of an entire range of a dataset, whether individual portions of that dataset have been updated or not. An INCREMENTAL backup copies only that portion of the dataset which has been updated since a previous backup, either full or incremental. The backup copy thus created represents a consistent view of the data within the dataset as of the time the copy was created.

Of course, those skilled in the art will appreciate that as a result of the process described above, the higher the backup frequency, the more accurately the backup copy will mirror the current state of data within a dataset. In view of the large volumes of data maintained within a typical state-of-the-art data processing system backing up that data is not a trivial operation. Thus, the opportunity cost of backing up data within a dataset may be quite high on a large multi-processing, multi-programming facility, relative to other types of processing.

Applications executed within a central processing system are in either a batch (streamed) or interactive (transactional) mode. In a batch mode, usually one application is executed at a time without interruption. Interactive mode is characterized by interrupt driven multiplicity of applications or transactions.

When a data processing system is in the process of backing up data in a batch mode system, each process, task or application within the data processing system is affected. That is, the processes supporting the batch mode operations are suspended for the duration of the copying. Those skilled in the art will recognize that this event is typically referred to as the "backup window." In contrast to batch mode operations, log based or transaction management applications are processed in the interactive mode. Such transaction management applications eliminate the "backup window" by concurrently updating an on-line dataset and logging the change. However, this type of backup copying results in a consistency described as "fuzzy." That is, the backup copy is not a precise "snapshot" of the state of a dataset/database at a single point in time. Rather, a log comprises an event file requiring further processing against the database.

A co-pending U.S. patent application Ser. No. 07/385,647, filed Jul. 25, 1989, entitled A Computer Based Method for Dataset Copying Using An Incremental Backup Policy, illustrates backup in a batch mode system utilizing a modified incremental policy. A modified incremental policy copies only new data or data updates since the last backup. It should be noted that execution of applications within the data processing system are suspended during copying in this system.

As described above, to establish a prior point of consistency in a log based system, it is necessary to "repeat history" by replaying the log from the last check point over the datasets or database of interest. The distinction between batch mode and log based backup is that the backup copy is consistent and speaks as of the time of its last recordation, whereas the log and database mode require further processing in the event of a fault in order to exhibit a point in time consistency.

U.S. Pat. No. 4,507,751, Gawlick et al., entitled Method and Apparatus For Logging Journal Data Using A Write Ahead Dataset, issued Mar. 25, 1985, exemplifies a transaction management system wherein all transactions are recorded on a log on a write-ahead dataset basis. As described within this patent, a unit of work is first recorded on the backup medium (log) and then written to its external storage address.

Co-pending U.S. patent application Ser. No. 07/524,206, filed May 16, 1990, entitled Method and Apparatus for Executing Critical Disk Access Commands, teaches the performance of media maintenance on selected portions of a tracked cyclic operable magnetic media concurrent with active access to other portions of the storage media. The method described therein requires the phased movement of customer data between a target track to an alternate track, diversion of all concurrent access request to the alternate track or tracks and the completion of maintenance and copy back from the alternate to the target track.

Requests and interrupts which occur prior to executing track-to-track customer data movement result in the restarting of the process. Otherwise, requests and interrupts occurring during execution of the data movement view a DEVICE BUSY state. This typically causes a re-queuing of the request.

Several of the cross-referenced patents applications set forth herein describe a so-called "time zero" backup copy system wherein execution of an application is suspended for a minimum period of time for purposes of creating a backup copy. In such a system, backup copies are created by first creating a dataset logical-to-physical storage system address concordance for designated datasets and thereafter resuming execution of the application. Formation of the backup copy is then accomplished on a scheduled or opportunistic basis by copying the designated tracks within the datasets from the storage subsystems to the host and then updating the address concordance in response to such copying. Application driven updates to uncopied designated datasets are processed by first buffering those updates, copying the affected uncopied designated tracks within the datasets to a storage subsystem memory, updating the address concordance in response to that copying and then processing the updates. In this manner, execution of an application is suspended for a minimal period of time necessary to create the logical-to-physical storage system address concordance and copies of portions of the designated dataset are only created for those portions which are updated prior to copying.

While this time zero or concurrent backup copy system represents a substantial improvement over the prior art, the transfer of large amounts of data from a storage subsystem to a host system for backup copying purposes still requires a substantial commitment of system assets. For example, one host system coupled to a storage subsystem may attempt to copy designated tracks within the datasets on a scheduled or opportunistic basis without realizing that selected tracks within that concurrent copy operation have recently been updated and, as a result of that updating been copied to storage subsystem memory. The address concordance within the storage subsystem controller is utilized to keep track of the copying of selected tracks within the concurrent copy dataset; however, a method is needed which may be utilized to apprise the host of the fact that selected tracks within a sequence defined for copying have already been copied to storage subsystem memory.

Therefore, it should be apparent that a need exists for a method and system which permits the automatic control of track transfer during concurrent copy operations in a manner such that the host system may be advised of the fact that a particular track has already been copied to storage subsystem memory.

SUMMARY OF THE INVENTION

It is therefore one object of the present invention to provide an improved method and system for concurrent copy operations in a data processing system.

It is another object of the present invention to provide an improved method and system for track transfer control during concurrent copy operations in a data processing system.

It is yet another object of the present invention to provide an improved method and system for automatically substituting an artificial track for a track which has been previously copied during track retrieval in a concurrent copy operation in a data processing system.

The foregoing objects are achieved as is now described. The method and system of the present invention may be utilized for transferring backup copies of designated multi-track datasets which are stored in a plurality of storage subsystems to a host system via data channel during concurrent execution of an application. Upon receiving a request for a backup copy, execution of an application is temporarily suspended. A dataset logical-to-physical storage system address concordance is formed and execution of the application is resumed thereafter. Any application initiated updates to affected tracks within the designated datasets which occur prior to generation of a backup copy are processed by buffering the updates, copying the affected tracks to storage subsystem memory, updating the address concordance and writing the updates to the affected tracks within the dataset. Requests from the host system to transfer a selected sequence of tracks within the designated multi-track dataset are then examined to determine if the sequence includes affected tracks which have previously been copied to storage subsystem memory. An artificial track is then automatically substituted into the requested sequence of selected tracks for each affected track which has previously been copied to storage subsystem memory during transfer of the selected sequence of tracks such that the host system is made aware of the previous copying of these affected tracks.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
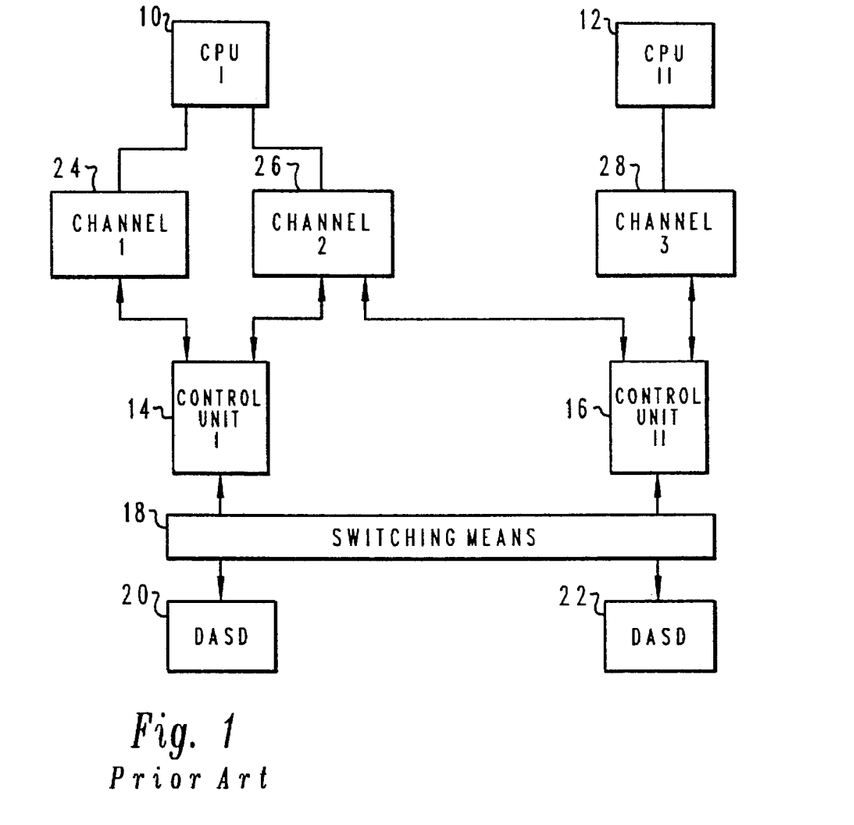
FIG. 1 illustrates a prior art multi-processing multi-programming environment wherein executing processes and applications randomly or sequentially access data from external storage.

With reference to the figures and in particular with reference to FIG. 1, a prior art multi-processing multi-programming environment is illustrated where executing processes and applications randomly or sequentially access data from external storage. Such systems include a plurality of central processing units 10, 12 which access external storage subsystems 14, 16, 18, 20, 22 over redundant channel demand and response interfaces 24, 26, 28.

The illustrated embodiment in FIG. 1 may be provided in which each processor within the data processing system is implemented utilizing an IBM/360 or 370 architected processor type having, as an example, an IBM MVS operating system. An IBM/360 architected processor is fully described in Amdahl et al., U.S. Pat. No. 3,400,371, entitled Data Processing System, issued on Sep. 3, 1968. A configuration in which multiple processors share access to external storage units is set forth in Luiz et al., U.S. Pat. No. 4,207,609, entitled Path Independent Device Reservation and Reconnection in a Multi-CPU and Shared Device Access System, issued Jan. 10, 1980.

The MVS operating system is also described in IBM Publication GC28-1150, entitled MVS/Extended Architecture System Programming Library: System Macros and Facilities, Vol. 1. Details of standard MVS or other operating system services, such as local lock management, subsystem invocation by interrupt or monitor, and the posting and waiting of tasks is omitted. These operating systems services are believed to be well known to those having skill in this art.

Still referring to FIG. 1, as described in Luiz et al., a processor process may establish a path to externally stored data in an IBM System 370 or similar system through an MVS or other known operating system by invoking a START I/O, transferring control to a channel subsystem which reserves a path to the data over which transfers are made. Typically, executing applications have data dependencies and may briefly suspend operations until a fetch or update has been completed. During such a transfer, the path is locked until the transfer is completed.

Figure 2:
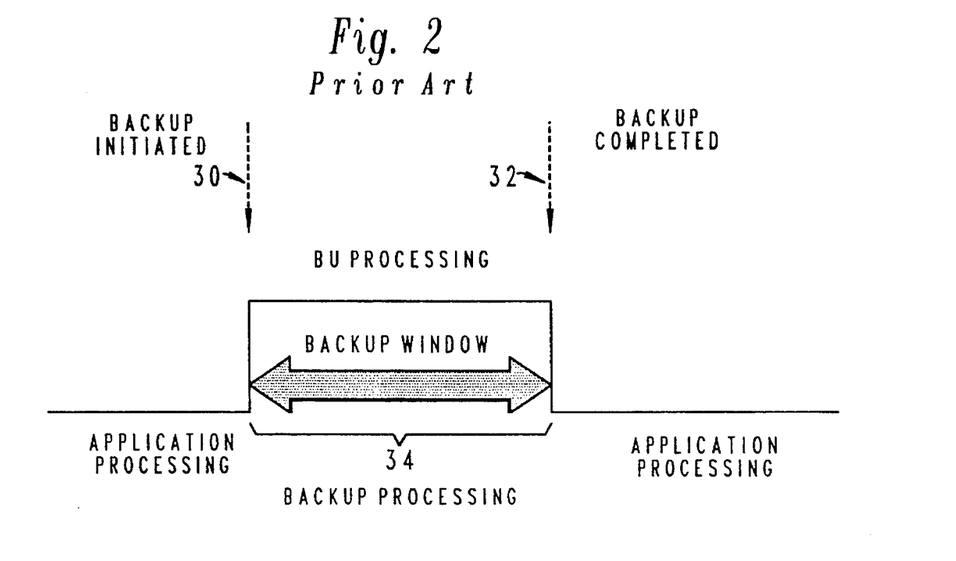
FIG. 2 illustrates a time line depiction of a backup process according to the prior art.

Referring to FIG. 2, a time line depiction of the backup process according to the prior art is illustrated. At a first time 30 a backup copy is initiated and applications are suspended or shut down. The suspension continues until the backup copy is completed at a second time 32. Termination of the backup process signifies that all the data specified for backup copy has been read from the source and written to an alternate storage memory. As can be seen, the backup window 34 spans the time from initiation of the backup copy to termination of the backup copy process.

Figure 3:
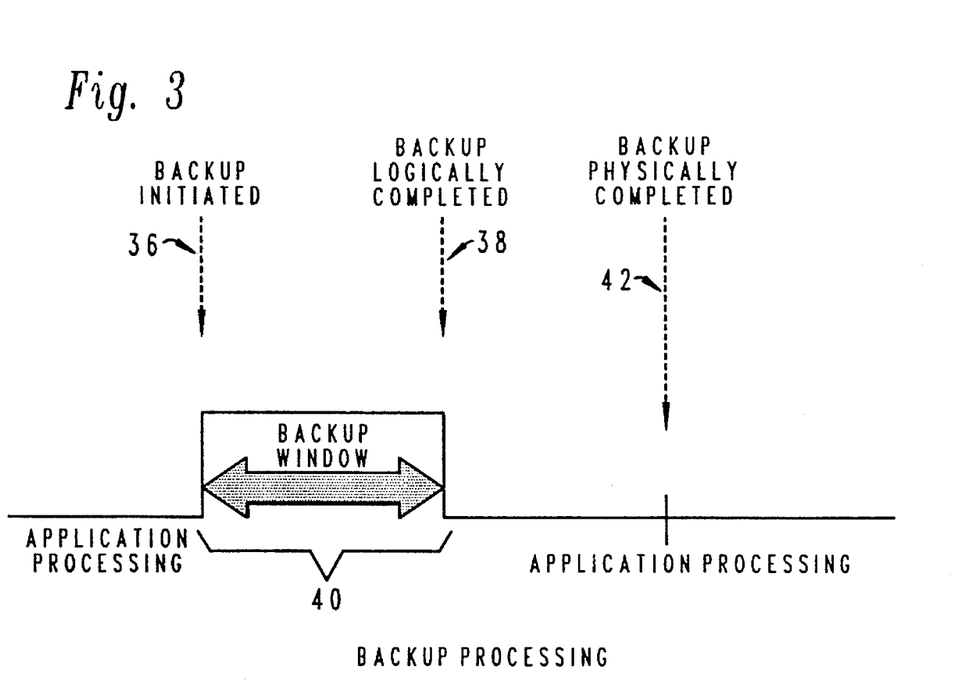
FIG. 3 illustrates a time line depiction of a time zero backup process as described in the cross-referenced patent applications.

FIG. 3 illustrates a time line depiction of a time zero backup process as described in the cross-referenced patent applications. At a first time 36 the backup copy process is initiated and execution of an application is suspended or shut down. Time 36 is known as "time zero," which means this is the time at which the snapshot of the state of the datasets is taken. As will be described below, the datasets are frozen at that point in time as far as the backup copy process is concerned.

At a second time 38 the backup copy is "logically completed," meaning each track within the datasets to be copied has been identified and mapped in a bit map, and execution of the application resumes. The datasets can now be used and updated by the application. As can be seen, the backup window 40 is significantly reduced, and is typically measured in milliseconds. Some time later, at a third time 42, the backup copy process is physically completed, meaning all datasets specified for backup copy have been read from the source and written to an alternative storage memory.

Figure 4:
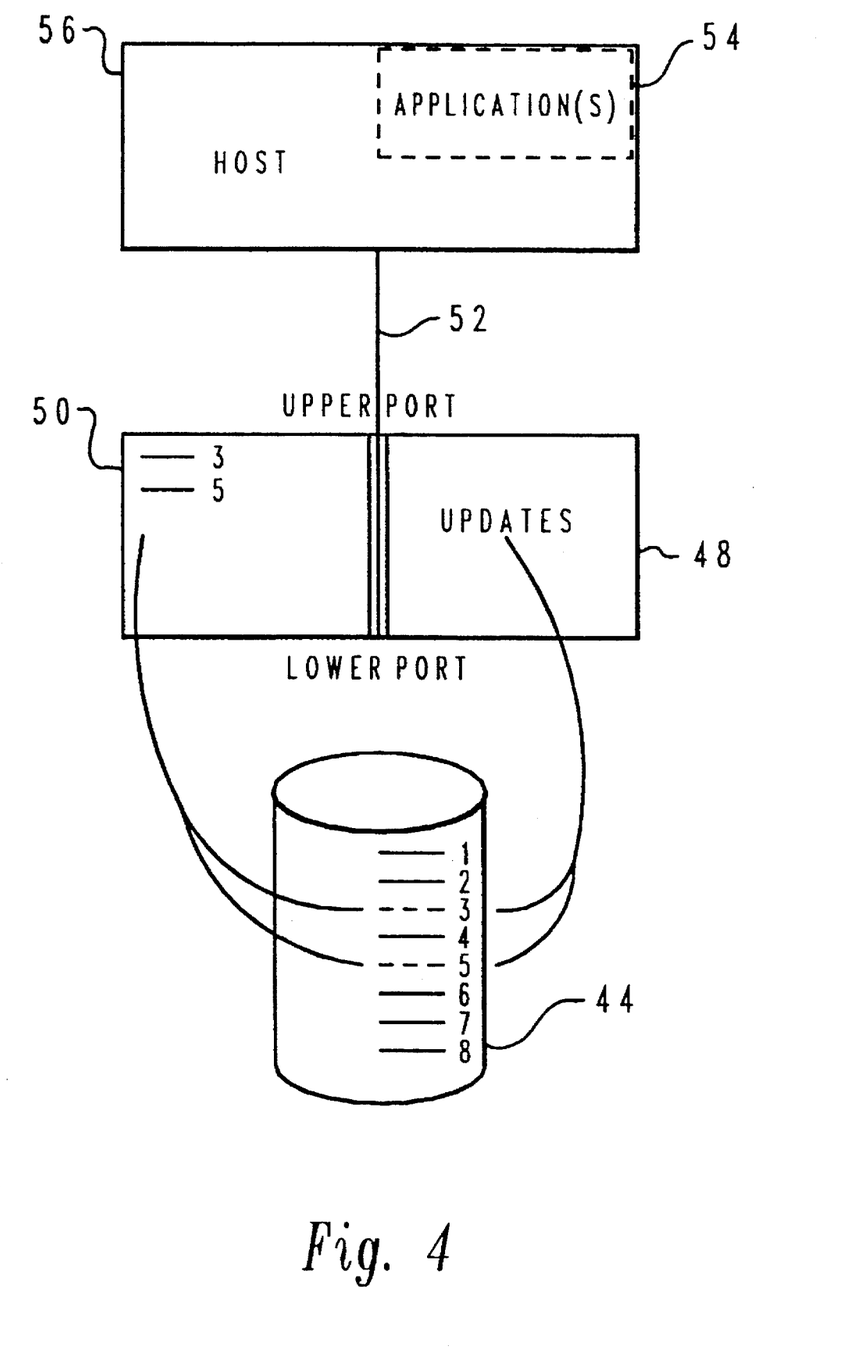
FIG. 4 is a pictorial representation of a method and system for generating and transferring a backup copy in accordance with the method and system of the present invention.

Referring now to FIG. 4, there is depicted a pictorial representation of a method and system for generating and transferring a backup copy of designated datasets in accordance with the method and system of the present invention. As illustrated, a time zero backup copy of data within a track cyclic storage device 44 may be created. As those skilled in the art will appreciate, data stored within such a device is typically organized into records and datasets. The real address of data within external storage is generally expressed in terms of Direct Access Storage Device (DASD) volumes, cylinders and tracks. The virtual address of such data is generally couched in terms of base addresses and offsets and/or extents from such base addresses.

Further, a record may be of the count-key-data format. A record may occupy one or more units of real storage. A "dataset" is a logical collection of multiple records which may be stored on contiguous units of real storage or which may be dispersed. Therefore, those skilled in the art will appreciate that if backup copies are created at the dataset level it will be necessary to perform multiple sorts to form inverted indices into real storage. For purposes of this explanation, backup processing will be described as managed primarily at the host and storage control unit level.

As illustrated, access to tracked cyclic storage device 44 by host 56 is typically accomplished utilizing a storage subsystem controller 48. Storage subsystem controller 48 may be implemented utilizing, for example, the Model 3990 Storage Subsystem Controller manufactured by International Business Machines Corporation. As illustrated, storage subsystem controller 48 includes a lower port for transferring data between tract cyclic storage device 44 and storage subsystem controller 48 and an upper port which is utilized to transfer data between storage subsystem controller 48 and host 56. The connection between storage subsystem controller 48 and host 56 may be implemented utilizing a high speed optical data serial data channel 52 which may be implemented utilizing the "ESCON" system, manufactured by International Business Machines Corporation, capable of transferring data between host 56 and storage system controller 48 at up to 17 megabytes per second.

As further illustrated within FIG. 4, storage subsystem controller 48 preferably includes storage subsystem memory 50 which may be utilized, in accordance with the method and system of the present invention, to store copies of tracks copied from tracked cyclic storage device 44 which have been updated by application initiated updates prior to the physical completion of a backup copy of those records, as described in the cross-referenced patent applications. Thus, an update initiated by application(s) 54 within host 56 which is coupled to storage subsystem controller 48 via optical data serial data channel 52 may result in updates to tracks 3 and 5 within tracked cyclic storage device 44. In accordance with the time zero backup copy technique, those updates are buffered within storage system controller 48 copies of tracks 3 and 5 are then written to storage subsystem memory 50, the address concordance describing the dataset to be backed up is modified to indicate that these tracks have been copied, and the updates are then initiated.

In accordance with an important feature of the present invention, which will be explained in greater detail below, host 56 may initiate a transfer of designated tracks within the datasets within tracked cyclic storage device 44 in an asynchronous manner on a scheduled or opportunistic basis. This is generally accomplished in a concurrent copy operation by utilizing a Get TrackSet operation which is supported by the Locate Record Extended (LRE) channel command word. The Get TrackSet operation is utilized to transfer those tracks which have previously been defined as a portion of the concurrent copy operation to the host system through the storage subsystem controller. It is possible in a concurrent copy operation that selected tracks within those tracks defined for the concurrent copy session have already been transferred to storage subsystem memory as a result of an application initiated update to those tracks. Thus, those skilled in the art will appreciate that it would be desirable to have a method and system whereby an indication of such a previous copying of a track may be automatically issued to the host. The failure to indicate that a track has previously been copied to storage subsystem memory may result in an updated track being written over a previously copied track, corrupting the data within the backup copy.

Figure 5A:
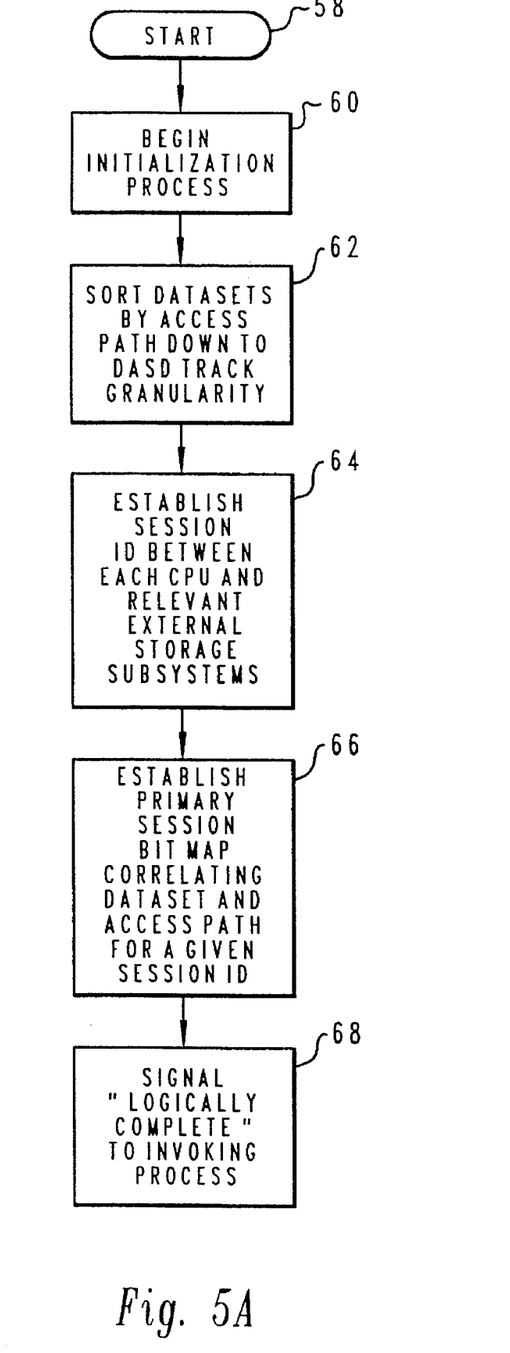
FIGS. 5a–5b are high level logic flowcharts which illustrate a method for generating a backup copy at the storage subsystem level in accordance with the method and system of the present invention.

The creation of a concurrent copy session and the processing of application initiate updates which occur prior to the creation of a backup copy for selected tracks within the concurrent copy session is illustrated with reference to FIGS. 5a and 5b which are high level logic flowcharts illustrating a backup copy at the storage subsystem level. Referring initially to FIG. 5a, the process begins at block 58 and thereafter passes to block 60 which illustrates the beginning of the initialization process. Thereafter, the process passes to block 62 which depicts the sorting of the datasets by access path, down to DASD track granularity. This sorting process will, necessarily, resolve an identification of the DASD volumes within which the datasets reside and the identification of the storage subsystems to which those volumes belong.

Next, as depicted at block 64, a session identification is established between each processor and the relevant external storage subsystems. The session identification is preferably unique across all storage subsystems, in order that multiple processors will not interfere with each others' backup copy processes. Thereafter, as illustrated at block 66, a primary session bit map is established which may be utilized, as set forth in detail herein and within the cross-referenced patent application, to indicate whether or not a particular track is part of the present copy session. Thereafter, as depicted at block 68, the "logically complete" signal is sent to the invoking process, indicating that application processing may continue; however, slight delays in updates will occur until such time as the backup copy is physically complete.

Figure 5B:
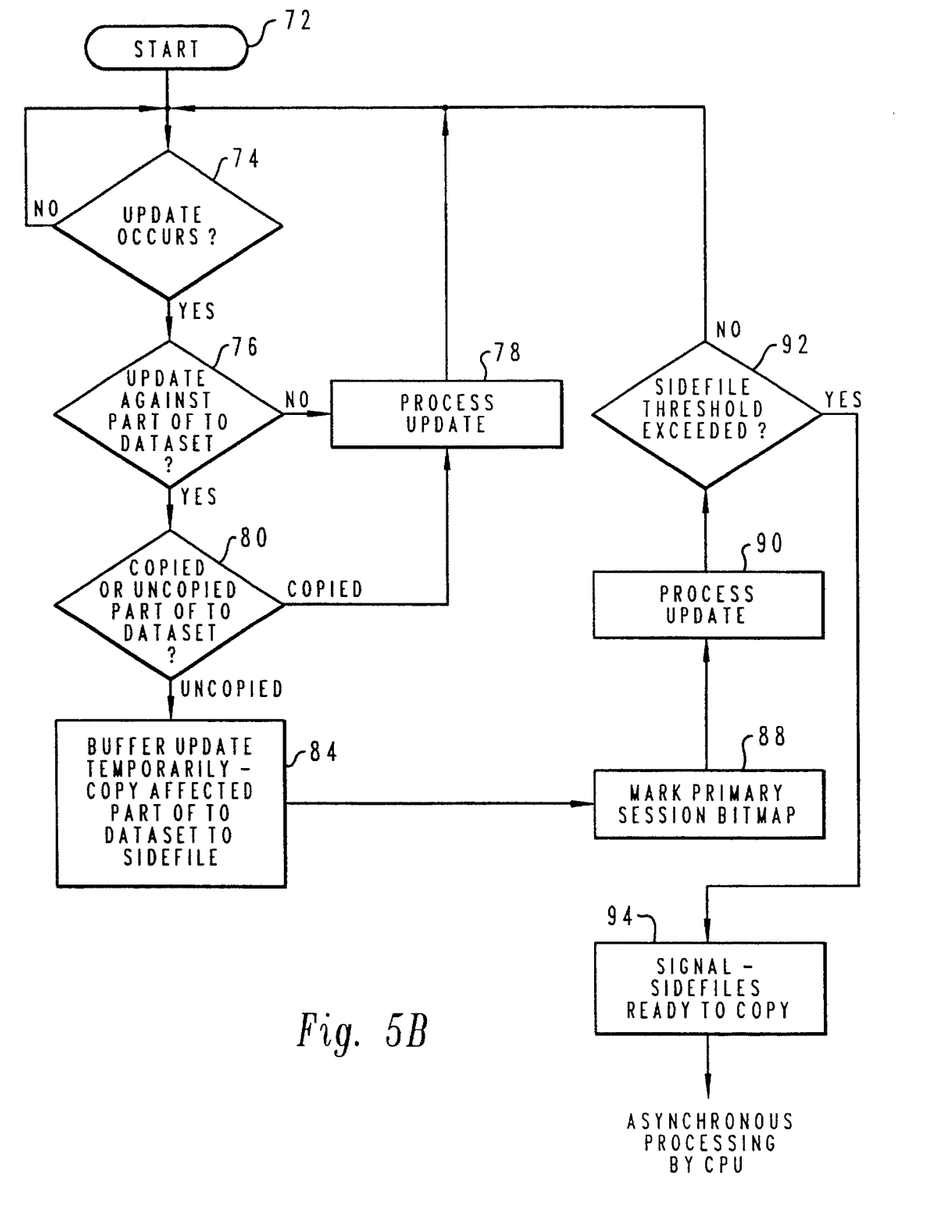

Referring now to FIG. 5b, there is illustrated a method for generating a backup copy at the storage subsystem level. The process begins at block 72 and thereafter passes to block 74. Block 74 illustrates a determination of whether or not an update has occurred. In the event no update has occurred, the process merely iterates until such time as an update does occur. In the event an update has occurred, the process passes to block 76. Block 76 illustrates a determination of whether or not the update initiated by an application within the data processing system is an update against a portion of the time zero or concurrent copy dataset. If not, the process merely passes to block 78 and the update is processed in a user transparent fashion. However, in the event the update is against a portion of the time zero dataset, the process passes to block 80.

Block 80 illustrates a determination of whether or not the update is against a copied or uncopied portion of the time zero dataset. That is, an update to a portion of data within the dataset which has been copied to the backup copy and is therefore physically complete, or a portion which has not yet been copied to the backup copy. If the portion of the dataset against which the update is initiated has already been copied to the backup copy, the process passes to block 78 which illustrate the processing of the update. Again, the process then passes from block 78 to block 74, to await the occurrence of the next update.

Referring again to block 80, in the event the update against the time zero dataset is initiated against a portion of the time zero dataset which has not yet been copied to the backup copy, the process passes to block 84. Block 84 illustrates the temporary buffering of the update and the copying of the affected portion of the time zero dataset to the storage subsystem memory 50 (see FIG. 4). Thereafter, the process passes to block 88, which illustrates the marking of the primary session bit map, indicating that this portion of the dataset has been updated within the external storage subsystem and that the time zero copy of this portion of the dataset is now within storage subsystem memory 50.

After marking the primary session bit map, the process passes to block 90 which illustrates the processing of that update. Thereafter, the process passes to block 92 which depicts a determination of whether or not the threshold within the storage subsystem memory 50 has been exceeded. If so, the process passes to block 94, which illustrates the generation of an attention signal, indicating that portions of datasets within the storage subsystem memory 50 are ready to be copied by the processor. Of course, those skilled in the art will appreciate that a failure to copy data from the storage subsystem memory 50 may result in the corruption of the backup copy if that memory is overwritten. Referring again to block 92, in the event the threshold within the storage subsystem memory 50 has not been exceeded, the process returns again to block 74 to await the occurrence of the next update.

Figure 6:
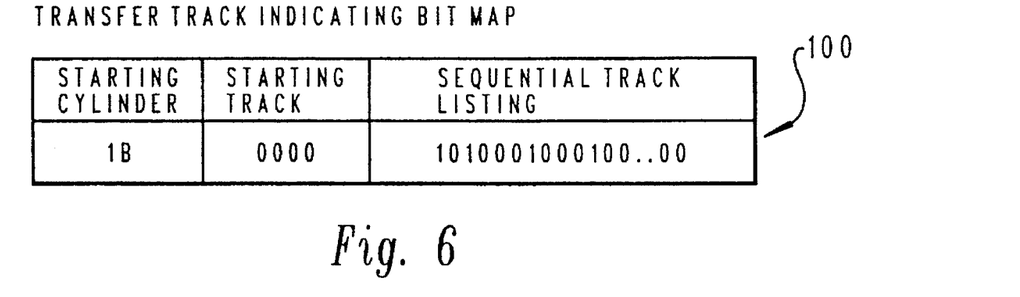
FIG. 6 is a pictorial representation of a transfer track indicating bit map which may be utilized to implement the method and system of the present invention.

Referring now to FIG. 6, there is depicted a pictorial representation of a transfer track indicating bit map which may be utilized to implement the method and system of the present invention. As illustrated in FIG. 6, transfer track indicating bit map 100 includes a column for identifying a starting cylinder within the storage subsystem, a column for identifying the starting track within that cylinder and a sequential bit map listing of the tracks to be accessed in accordance with a request for a copy of those tracks from the host system.

As set forth within the cross-referenced patent application entitled *Nonsynchronous DASD Control* a sequential listing of bits may be utilized to identify those tracks which are to be processed within the storage device. While FIG. 6 indicates a single transfer track indicating bit map those skilled in the art upon reference to the aforementioned cross-referenced patent application will appreciate that two such bit maps may be utilized for nonsynchronous DASD control. That is, a channel bit map and a device bit map may be utilized in those instances in which nonsynchronous transfer occurs. That is, a system wherein the channel and device are not operating on the same track simultaneously.

Still referring to FIG. 6, an examination of the sequential track listing bit map contained within transfer track indicating bit map 100 indicates that tracks 0, 2, 6, and 10 are identified within the sequence of tracks which the host system desires to transfer to the host system from the storage subsystem.

Figure 7:
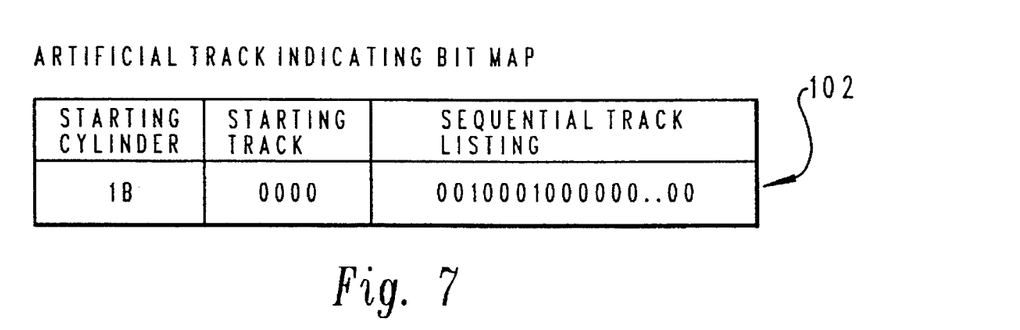
FIG. 7 is a pictorial representation of an artificial track indicating bit map which may be utilized to implement the method and system of the present invention.

A transfer track indicating bit map may then be utilized, in conjunction with the primary session bit map described above, to create artificial track indicating bit map 102 of FIG. 7. Artificial track indicating bit map 102 is utilized to identify, by means of a sequential bit map such as that described above, those tracks within the requested sequence of tracks to be transferred which have previously been copied to the storage subsystem memory.

Thus, upon reference to FIG. 7, those skilled in the art will appreciate that tracks 2 and 6, as indicated therein, have previously been the subject of an application initiated update and have been transferred to storage subsystem memory for eventual transfer to the host system as a part of the backup copy for this concurrent copy operation. As a result of this previous copying of these tracks, if tracks 2 and 6 are simply copied as a result of the request from the host system set forth within the transfer track indicating bit map of FIG. 6, the now changed data within tracks 2 and 6 will be overwritten over the backup copy version of those tracks and the backup copy will be corrupted.

Figure 8:
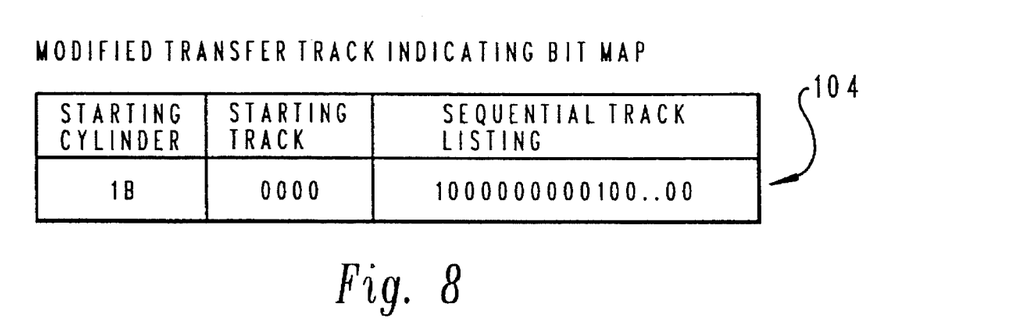
FIG. 8 is a pictorial representation of the transfer track indicating bit map of FIG. 6, as modified by the status of the artificial track indicating bit map of FIG. 7, in accordance with the method and system of the present invention.

Next, with reference to FIG. 8, there is illustrated a modified transfer track indicating bit map 104 which is constructed utilizing artificial track indicating bit map 102 of FIG. 7 and transfer track indicating bit map 100 of FIG. 6. Modified transfer track indicating bit map 104 is created by starting with transfer track indicating bit map 100 and resetting each bit therein which is set within artificial track indicating bit map 102. Thus, modified transfer track indicating bit map 104 constitutes a sequential bit map listing of those tracks within the sequential listing of tracks from the host system which were contained within the original sequential track listing and which have not previously been copied to storage subsystem memory.

Upon reference to the foregoing those skilled in the art will appreciate that by utilizing artificial track indicating bit map 102 of FIG. 7 and modified transfer track indicating bit map 104 of FIG. 8 the storage subsystem controller may rapidly and efficiently determine whether or not to transfer an actual track listing from the storage subsystem device or an artificial or "dummy" track such as a byte containing eight hexadecimal characters "F." It should also be noted that as a result of the manner in which modified transfer track indicating bit map 104 is created from transfer track indicating bit map 100 and artificial track indicating bit map 102, that it is not possible for the same bit position to be set within both artificial track indicating bit map 102 and modified transfer track indicating bit map 104. Thus, by controlling the transfer of tracks to the host system utilizing both artificial track indicating bit map 102 and modified transfer track indicating bit map 104, a determination is made during the read/write portion of a track transfer operation, a relatively time insensitive portion of the track transfer, so that no additional processing need be added during time critical areas of the transfer.

Of course, multiple transfer track indicating bit maps may be created for a sequential series of data tracks which span several cylinders and, following the transfer of the last artificial track or actual data track, if the last bit is reset, a cylinder switch may be performed and a subsequent sequence of tracks from another cylinder may be initiated. By modifying the transfer track indicating bit map in a manner described herein the storage device will operate as though only those tracks set forth within the modified transfer track indicating bit map 104 are to be transferred and artificial tracks may be inserted at the storage subsystem controller, without unduly complicating or delaying the transfer of tracks from the storage subsystem device.

Figure 9:
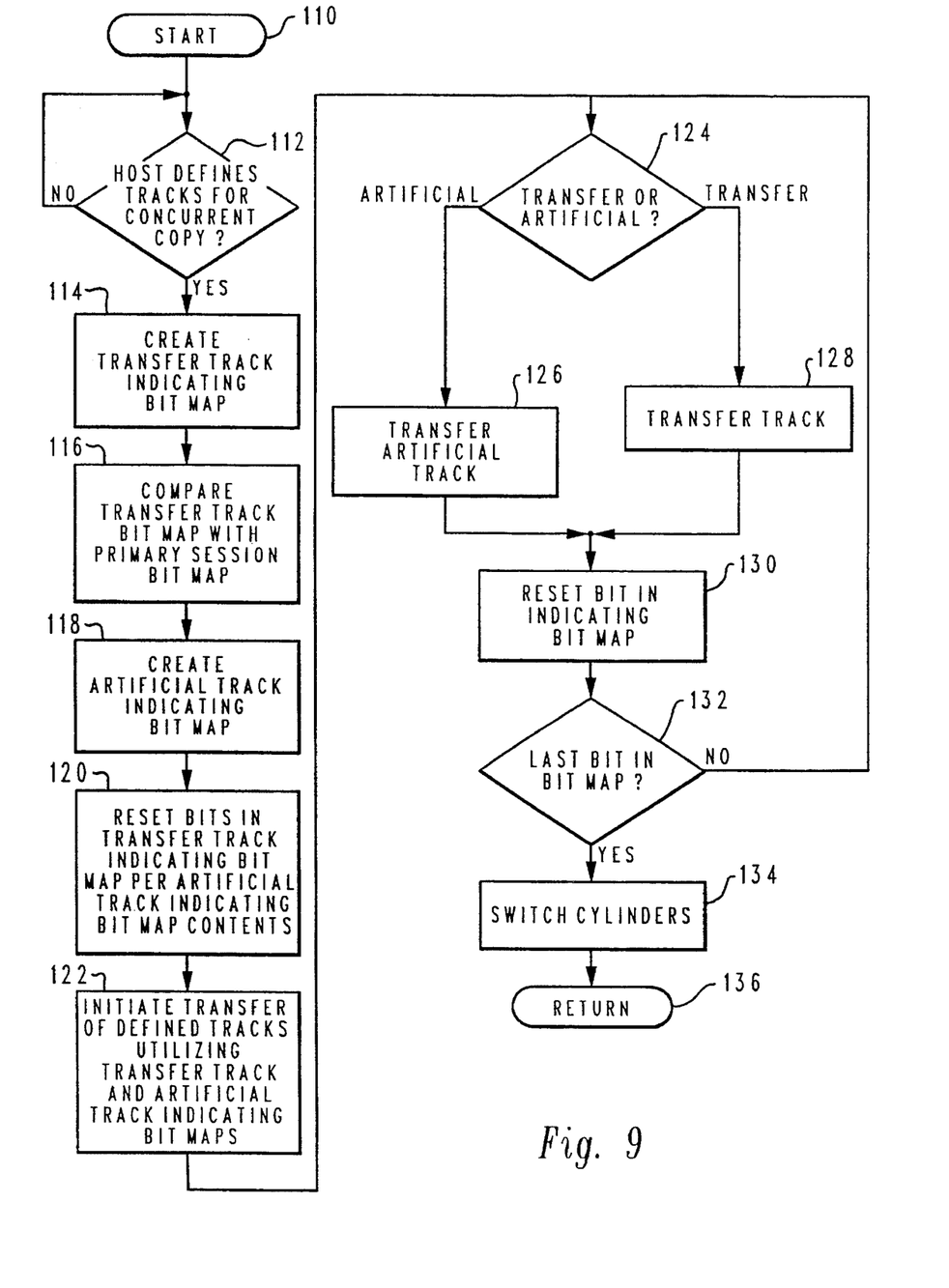
FIG. 9 is a high level logic flowchart illustrating the control of track transfer during a concurrent copy operation in accordance with the method and system of the present invention.

Finally, with reference to FIG. 9, there is depicted a high level logic flowchart which illustrates the control of track transfers during a concurrent copy operation in accordance with the method and system of the present invention. As illustrated, the process begins at block 110 and thereafter passes to block 112. Block 112 illustrates a determination of whether or not the host has defined a sequence of tracks for a concurrent copy operation. That is, whether a Get TrackSet operation has begun which specifies a sequence of tracks to be transferred to the host from the concurrent copy session. If not, the process merely iterates until such time as a definition occurs. However, in the event a command is received specifying a sequence of tracks for concurrent copy, the process passes to block 114.

Block 114 illustrates the creation of a transfer track indicating bit map such as the transfer track indicating bit map set forth within FIG. 6. Of course, as described above, the transfer track indicating bit map may include a sequential listing of multiple tracks from a plurality of cylinders. Next, the process passes to block 116 which illustrates the comparison of the transfer track indicating bit map previously created with the primary session bit map which includes an indication of which tracks within the present concurrent copy session have been affected by application initiated updates and previously copied to storage subsystem memory.

Block 118 illustrates the creation of an artificial track indicating bit map, such as artificial track indicating bit map 102 of FIG. 7. The artificial track indicating bit map comprises a sequential bit map identifying those tracks within the sequence of tracks specified by the host for transfer which have previously been copied to storage subsystem memory. The process then passes to block 120 which illustrates the resetting of the bits within the transfer track indicating bit map, in accordance with those bits within the artificial track indicating bit map which are set.

Next, the process passes to block 122 which illustrates the initiation of transfer of defined tracks utilizing the transfer track and artificial track indicating bit maps created above. The process then passes to block 124 which illustrates the examination of the most significant bit within the artificial track indicating bit map and sequential track indicating bit map in a sequential manner to determine whether or not an artificial track or an actual data track should be transferred. If an artificial track is to be transferred the process passes to block 126 which illustrates the transferring of an artificial or "dummy" track from the storage subsystem controller to the host. The actual content of the artificial track is not important; however, the content should be known to the host system, as its existence may be utilized to verify that a particular track within the specified sequence has previously been transferred to storage subsystem memory.

Referring again to block 124, in the event the bit within the indicating bit maps under present consideration is from the modified transfer track indicating bit map, an actual transfer of data track is to be accomplished. The process then passes to block 128 which illustrates the transferring of a data track from the data storage subsystem to the host system. Next, after transferring either an artificial track or an actual data track, the process passes to block 130 which depicts the resetting of the bit within the appropriate indicating bit map. Each track which is transferred to the host system, whether artificial or actual data, causes the system to reset the bit at that point within the sequential bit map listing, confirming that a track has been transferred.

The process then passes to block 132. Block 132 illustrates a determination of whether or not the bit previously under consideration is the last bit within the pair of bit maps and if not, the process returns iteratively to block 124 for a determination of whether or not the next bit within the bit maps will initiate the transfer of an artificial track or an actual data track in the manner described above. However, if the last bit within the bit map has been encountered, the process passes to block 134. Block 134 illustrates the switching of cylinders within the storage subsystem, if desired, and the process then passes to block 136 and returns. Thus, in the event the transfer track indicating bit map includes multiple cylinders the process will return to the transfer of defined tracks utilizing the transfer track and artificial track indicating bit maps as described above.

Upon reference to the foregoing those skilled in the art will appreciate that by creating the artificial track indicating bit map and modified transfer track indicating bit map described herein, control of the transfer of data tracks within a concurrent copy operation may be greatly enhanced by automatically substituting an artificial or "dummy" track into a requested sequence of tracks for transfer to the host, wherein a subsequent transfer of a track which was previously copied to storage subsystem memory as a result of being affected by an application initiated update will not occur.

While the invention has been particularly shown and described with reference to a preferred embodiment, it will be understood by those skilled in the art that various changes in form and detail may be made therein without departing from the spirit and scope of the invention.

We claim:

1. A method in a data processing system for transferring a backup copy of multiple tracks within designated datasets stored in a plurality of storage subsystems to a host system via a data channel during concurrent execution of an application within said host system wherein each of said storage subsystems includes storage subsystem memory associated therewith, said method comprising the steps of:

suspending execution of said application in response to a request for generating a backup copy;

forming a dataset logical-to-physical storage subsystem address concordance for said designated datasets;

resuming execution of said application upon completion of said forming of said address concordance;

processing any application initiated updates to tracks affected by said updates within said designated datasets which updates occur prior to generation of a backup copy of said tracks affected by said updates within said designated datasets by buffering said updates, copying said tracks affected by said updates within said designated datasets to said storage subsystem memory, updating said address concordance in response to said copying, and writing said updates to said tracks affected by said updates within said designated datasets within said plurality of storage subsystems;

utilizing said address concordance in response to a request from said host system to transfer a portion of said designated datasets which includes a sequence of selected tracks to determine if said sequence of selected tracks includes tracks affected by said updates which have been previously copied to said storage subsystem memory; and automatically substituting an artificial track into said sequence of selected tracks in place of each track affected by said updates which has been previously copied to storage subsystem memory during transfer of said portion of said designated datasets to said host system.

2. The method in a data processing system for transferring a backup copy of multiple tracks within designated datasets stored in a plurality of storage subsystems to a host system via a data channel according to claim 1, further including the step of building a transfer track indicating bit map in response to said request from said host system to transfer a portion of said designated datasets which includes a sequence of selected tracks, said transfer track indicating bit map indicating a sequence in which tracks within said storage subsystem are to be transferred.

3. The method in a data processing system for transferring a backup copy of multiple tracks within designated datasets stored in a plurality of storage subsystem to a host system via a data channel according to claim 2, wherein said step of utilizing said address concordance to determine if said sequence of selected tracks includes tracks affected by said updates which have been previously copied to storage subsystem memory comprises the step of utilizing said address concordance and said transfer track indicating bit map to build an artificial track indicating bit map which indicates a sequence of tracks within said storage subsystem which have been previously copied to storage subsystem memory.

4. The method in a data processing system for transferring a backup copy of multiple tracks within designated datasets stored in a plurality of storage subsystem to a host system via a data channel according to claim 3, further including the step of resetting each bit within said transfer track indicating bit map which corresponds to a bit which is set within said artificial track indicating bit map prior to initiating transfer of said portion of said designated datasets to said host system.

5. The method in a data processing system for transferring a backup copy of multiple tracks within designated datasets stored in a plurality of storage subsystem to a host system via a data channel according to claim 4, further including the step of resetting a corresponding bit within said transfer track indicating bit map after transferring a track indicated by that bit.

6. The method in a data processing system for transferring a backup copy of multiple tracks within designated datasets stored in a plurality of storage subsystem to a host system via a data channel according to claim 4, further including the step of resetting a corresponding bit within said artificial track indicating bit map after transferring an artificial track in substitution of a track indicated by that bit.

7. A data processing system for transferring a backup copy of multiple tracks within designated datasets stored in a plurality of storage subsystems to a host system via a data channel during concurrent execution of an application within said host system wherein each of said storage subsystems includes storage subsystem memory associated therewith, said data processing system comprising:

means for suspending execution of said application in response to a request for generating a backup copy;

means for forming a dataset logical-to-physical storage subsystem address concordance for said designated datasets;

means for resuming execution of said application upon completion of said forming of said address concordance;

means for processing any application initiated updates to tracks affected by said updates within said designated datasets which updates occur prior to generation of a backup copy of said tracks affected by said updates of said designated datasets by buffering said updates, copying said tracks affected by said updates of said designated datasets to said storage subsystem memory, updating said address concordance in response to said copying, and writing said updates to said affected tracks of said designated datasets within said plurality of storage subsystems;

means for utilizing said address concordance in response to a request from said host system to transfer a portion of said designated datasets which includes a sequence of selected tracks to determine if said sequence of selected tracks includes tracks affected by said updates which have been previously copied to said storage subsystem memory; and means for automatically substituting an artificial track into said sequence of selected tracks in place of each track affected by said updates which has been previously copied to storage subsystem memory during transfer of said portion of said designated datasets to said host system.

8. The data processing system for transferring a backup copy of multiple tracks within designated datasets stored in a plurality of storage systems to a host system via data channel according to claim 7, further including means for building a transfer track indicating bit map in response to said request from said host system to transfer a portion of said designated datasets which includes a sequence of selected tracks, said transfer track indicating bit map indicating a sequence in which tracks within said storage subsystem are to be transferred.

9. The data processing system for transferring a backup copy of multiple tracks within designated datasets stored in a plurality of storage systems to a host system via data channel according to claim 8, wherein said means for utilizing said address concordance to determine if said sequence of selected tracks includes tracks affected by said updates which have been previously copied to storage subsystem memory comprises means for utilizing said address concordance and said transfer track indicating bit map to build an artificial track indicating bit map which indicates a sequence of tracks within said storage subsystem which have previously been copied to storage subsystem memory.

10. The data processing system for transferring a backup copy of multiple tracks within designated datasets stored in a plurality of storage systems to a host system via data channel according to claim 9, further including means for resetting each bit within said transfer track indicating bit map which corresponds to a bit which is set within said artificial track indicating bit map prior to initiating transfer of said portion of said designated datasets to said host system.

11. The data processing system for transferring a backup copy of multiple tracks within designated datasets stored in a plurality of storage systems to a host system via data channel according to claim 10, further including means for resetting a corresponding bit within said transfer track indicating bit map after transferring a track indicated by that bit.

12. The data processing system for transferring a backup copy of multiple tracks within designated datasets stored in a plurality of storage systems to a host system via data channel according to claim 10, further including means for resetting a corresponding bit within said artificial track indicating bit map after transferring an artificial track in substitution of a track indicated by that bit.

* * * * *